(12) United States Patent
Cheater

(10) Patent No.: US 9,670,820 B2
(45) Date of Patent: Jun. 6, 2017

(54) DUCT ARRANGEMENT FOR AN INTERNAL COMBUSTION ENGINE

(71) Applicant: ROLLS-ROYCE PLC, London (GB)

(72) Inventor: Geoffrey Vincent Cheater, Chepstow (GB)

(73) Assignee: ROLLS-ROYCE plc, London (GB)

( * ) Notice: Subject to any disclaimer, the term of this patent is extended or adjusted under 35 U.S.C. 154(b) by 261 days.

(21) Appl. No.: 14/714,746

(22) Filed: May 18, 2015

(65) Prior Publication Data

US 2015/0354430 A1 Dec. 10, 2015

(30) Foreign Application Priority Data

Jun. 6, 2014 (GB) .................................. 1410057.2

(51) Int. Cl.
  *F01N 3/00* (2006.01)
  *F01N 3/02* (2006.01)
  (Continued)

(52) U.S. Cl.
  CPC ............ *F01N 13/004* (2013.01); *B63H 21/16* (2013.01); *B63H 21/32* (2013.01); *B63J 2/12* (2013.01);
  (Continued)

(58) Field of Classification Search
  CPC ...... F01N 13/004; F01N 2590/02; F02C 7/04; F05D 2260/608; F01D 25/08;
  (Continued)

(56) References Cited

U.S. PATENT DOCUMENTS 4,303,035 A * 12/1981 Burns ........................ F01N 3/04
114/187
6,083,098 A 7/2000 Sotoda
(Continued)

FOREIGN PATENT DOCUMENTS

EP 2 194 237 A2 6/2010
EP 2 599 967 A1 6/2013
(Continued)

OTHER PUBLICATIONS

Nov. 16, 2015 Extended Search Report issued in European Patent Application No. 15167931.3.
(Continued)

*Primary Examiner* — Thai Ba Trieu
*Assistant Examiner* — Diem Tran
(74) *Attorney, Agent, or Firm* — Oliff PLC

(57) ABSTRACT

A duct arrangement for an internal combustion engine comprises an exhaust duct, an inlet duct and a cooling air duct. The exhaust duct is contained within the cooling air duct for substantially its whole length and the cooling air duct is contained within the inlet duct for substantially its whole length, so that in use the cooling air duct provides a barrier to limit heat transfer between gas flowing in the exhaust duct and gas flowing in the inlet duct. The invention avoids the need for separate inlet and exhaust ducts with their attendant disadvantages. The separation of the inlet and exhaust ducts by the cooling air duct allows the inlet air to be kept as cool as possible, as is necessary for efficient engine operation.

13 Claims, 3 Drawing Sheets

(51) Int. Cl.
    *F01N 13/00*     (2010.01)
    *B63J 2/12*     (2006.01)
    *B63H 21/16*     (2006.01)
    *B63H 21/32*     (2006.01)
    *F01D 25/30*     (2006.01)
    *F01D 25/08*     (2006.01)
    *F02C 7/04*     (2006.01)
    *B63G 13/02*     (2006.01)

(52) U.S. Cl.
    CPC ............. *F01D 25/08* (2013.01); *F01D 25/30* (2013.01); *F02C 7/04* (2013.01); *B63G 2013/025* (2013.01); *F01N 2590/02* (2013.01); *F05D 2260/608* (2013.01); *Y02T 50/675* (2013.01)

(58) Field of Classification Search
    CPC ......... F01D 25/30; B63H 21/16; B63H 21/32; B63J 2/12; Y02T 50/675
    USPC .................................................... 60/298, 320
    See application file for complete search history.

(56) References Cited

U.S. PATENT DOCUMENTS

| | | | |
|---|---|---|---|
| 6,358,109 B1* | 3/2002 | Neisen | F01N 13/009 440/89 B |
| 6,412,284 B1 | 7/2002 | Horner | |
| 6,742,339 B2* | 6/2004 | Horner | F01D 25/30 60/39.5 |
| 7,373,779 B2* | 5/2008 | Czachor | F01D 25/12 60/39.83 |

FOREIGN PATENT DOCUMENTS

| | | |
|---|---|---|
| JP | H01-158529 U | 11/1989 |
| JP | 2001-020716 A | 1/2001 |
| JP | 2002-089284 A | 3/2002 |
| WO | 99/25607 A1 | 5/1999 |

OTHER PUBLICATIONS

Dec. 12, 2014 Search Report issued in British Application No. 1410057.2.

\* cited by examiner

DUCT ARRANGEMENT FOR AN INTERNAL COMBUSTION ENGINE

This invention relates to inlet, exhaust and cooling air ducts for internal combustion engine. It is particularly suitable for installations of engines for marine applications.

Engines in ships commonly provide mechanical drive to the ship's propulsion system via a gearbox and mechanical drivetrain. The location of the engine within the ship is therefore often dictated by the requirements of the mechanical drive system.

Internal combustion engines, such as gas turbine engines, require a supply of clean air for combustion and an exhaust to remove the combustion products. In marine applications, the inlet and exhaust flows are commonly routed through separate ducts which run from the engine to convenient positions on the outside of the ship. When the position of the engine is dictated by mechanical considerations, as noted above, this will constrain the routing of the inlet and exhaust ducts.

Engines in ships are commonly installed in engine enclosures within the ship's engine room, and it is common for such installations to require cooling for the engine enclosure (this is also referred to as package cooling). Sometimes this is achieved by sourcing cooling air from the engine room and extracting it through the exhaust duct; sometimes a dedicated cooling air duct provides cooling air from outside the ship.

FIG. 1 shows a schematic illustration of a known arrangement of inlet and exhaust ducts for a marine installation of a gas turbine engine. The gas turbine engine 12 has an engine intake 14 through which air flows to compressor stages 16. Following combustion, the hot gases pass through turbine stages 18 to an engine exhaust 20.

The gas turbine engine 12 is installed within the hull of a ship (not shown in the drawing) and therefore ducts are required to supply clean air to the engine intake 14 and to carry away the exhaust gases from the engine exhaust 20.

An inlet duct 22 has a duct intake 24 on the outside of the ship into which air 26 flows in use. The duct intake 24 has filters 28 to remove particulates from the air flow 26. The clean, filtered air flow passes through the inlet duct 22 to the engine intake 14. In any gas turbine installation, the inlet has to provide clean air to the engine with minimal pressure loss and minimal turbulence, because pressure losses in the intake can have a significant impact on the performance of the gas turbine engine. For this reason, the intake duct should have a large cross-sectional area without radical changes of section along its length. It is also important that the inlet air remains as cool as possible for efficient operation of the gas turbine, and so the inlet duct and exhaust duct are conventionally routed apart from each other to prevent heat transfer.

The exhaust gases from the gas turbine engine 12 pass from the engine exhaust 20 through an exhaust duct 30. The exhaust gases flow, as shown by the arrows 32, to an exhaust outlet 34 on the outside of the ship. As for the inlet duct, the exhaust should be designed to minimise losses, which again dictates a large cross-sectional area without radical changes of section along its length. To avoid the transfer of heat from the exhaust gases 32 to the inlet air flow 26, the exhaust duct 30 is routed apart from the inlet duct 22. The exhaust duct 30 is also lagged with thermal insulation, which reduces the amount of heat transferred into the body of the ship.

As noted above, the gas turbine engine is installed in an engine enclosure 36 within the engine room (not shown) of the ship, in a convenient position within the hull as dictated by mechanical or other considerations. A flow of cooling air is required to maintain an acceptable temperature within the engine enclosure 36. Accordingly, an air flow 38 is provided by a fan 40 into a space 42 surrounding the gas turbine engine 12. The air then flows through a duct 44 to join the exhaust flow in the exhaust duct 30. The air flow 38 may be taken from within the engine room, or may be supplied by a separate cooling air duct (not shown in the drawing) which may have its intake on the outside of the ship.

The consequence of the requirements noted above is that two separate ducts are necessary, one for the inlet and one for the exhaust, both of relatively large cross-sectional area and routed apart from each other to avoid heat transfer between them.

This can be disruptive to the layout and operation of the ship as well as adding weight and complexity. If package cooling air is also sourced from outside the ship, a third duct is required which exacerbates these problems.

The inventor has devised a novel duct arrangement which reduces or overcomes the problems of known arrangements such as that shown in FIG. 1.

In a first aspect, the invention provides a duct arrangement for an internal combustion engine, the arrangement comprising an exhaust duct, an inlet duct and a cooling air duct, the arrangement characterised in that the exhaust duct is contained within the cooling air duct for substantially its whole length and the cooling air duct is contained within the inlet duct for substantially its whole length so that in use the cooling air duct provides a barrier to limit heat transfer between gas flowing in the exhaust duct and gas flowing in the inlet duct.

By containing the ducts within one another, effectively only one duct needs to be accommodated. As indicated above, this greatly simplifies the installation of the duct arrangement. Interposing the cooling air duct between the exhaust duct and the inlet duct, to provide thermal isolation between them, allows the inlet air to be kept as cool as possible, which is necessary for efficient engine operation. Because the hot gases in the exhaust duct are entirely surrounded by cooler gases (in the cooling air duct and inlet duct) less heat is transferred into the body of the ship, which simplifies the heat management for the entire vessel and may also reduce the vessel's infrared signature.

There may be thermal insulation between the exhaust duct and the cooling air duct.

Thermal insulation prevents or reduces heat transfer from the exhaust duct into the cooling air duct, which would reduce the effectiveness of the package cooling. It also provides further thermal isolation between the exhaust duct and the inlet duct, further reducing the heat transfer between the two.

There may be a plenum between the inlet duct and the engine. The plenum may comprise a filter for the inlet air. The inlet duct and cooling air duct may share a common air intake.

The cooling air flow does not require filtering, but the inlet air does. If a common intake is used for the inlet air and the cooling air, and the filter is positioned at the intake as in FIG. 1, additional filter capacity is needed for the cooling air. This adds weight and complexity to the engine. By providing a plenum and locating the filter within it, the cooling air and inlet air may share a common air intake. The cooling air flow may be separated from the inlet air flow before the plenum, and then only the air is filtered that needs to be. A further advantage of locating the filter further away from the intake is that it is less likely to be affected by water carried into the intake along with the air flow.

The exhaust duct, the inlet duct and the cooling air duct may be concentric for substantially their whole length.

If the ducts are concentric the thermal insulation between them will be more uniform, because the effective thickness of the respective layers will be substantially equal around the whole circumference.

The arrangement may be installed in a structure, and the inlet duct, the exhaust duct and the cooling air duct may terminate in a common opening at an outside wall of the structure. The structure may be a ship.

As noted above, the use of a combined duct provides advantages in the layout and operation of an installation. If only a single opening is required at the outside of the structure, such as the hull of a ship, this further simplifies the construction of the ship.

In a marine installation, the inlet duct may terminate in an intake facing towards the bow of the ship. The exhaust duct may terminate in an outlet facing towards the stern of the ship.

With such an arrangement, the normal forward movement of the ship will encourage clean air into the inlet duct and help to carry away exhaust gases. It will also help to prevent contamination of the inlet air flow by exhaust gases.

Particularly in a marine installation, the inlet and exhaust ducts may extend generally horizontally and the common opening may be on the side of the hull.

This arrangement may be particularly beneficial where the engine is combined with an alternator driven from the 'cold', or compressor, end of the engine because all of the ducting can then be arranged to extend from the 'hot', or turbine, end. It may also offer advantages in maintenance, because the duct arrangement can be removed out of the side of the ship, leaving an aperture through which the engine and alternator may be removed.

The engine may be a gas turbine engine.

In a second aspect, the invention provides a ship comprising a duct arrangement as in the first aspect of the invention.

Embodiments of the invention will now be described in more detail, by way of example only, with reference to the attached drawings, in which FIG. 1 shows schematically a cross-sectional view of a known duct arrangement for a marine installation of a gas turbine engine;

In the drawings, like parts are indicated by like numerals.

Figure 1:
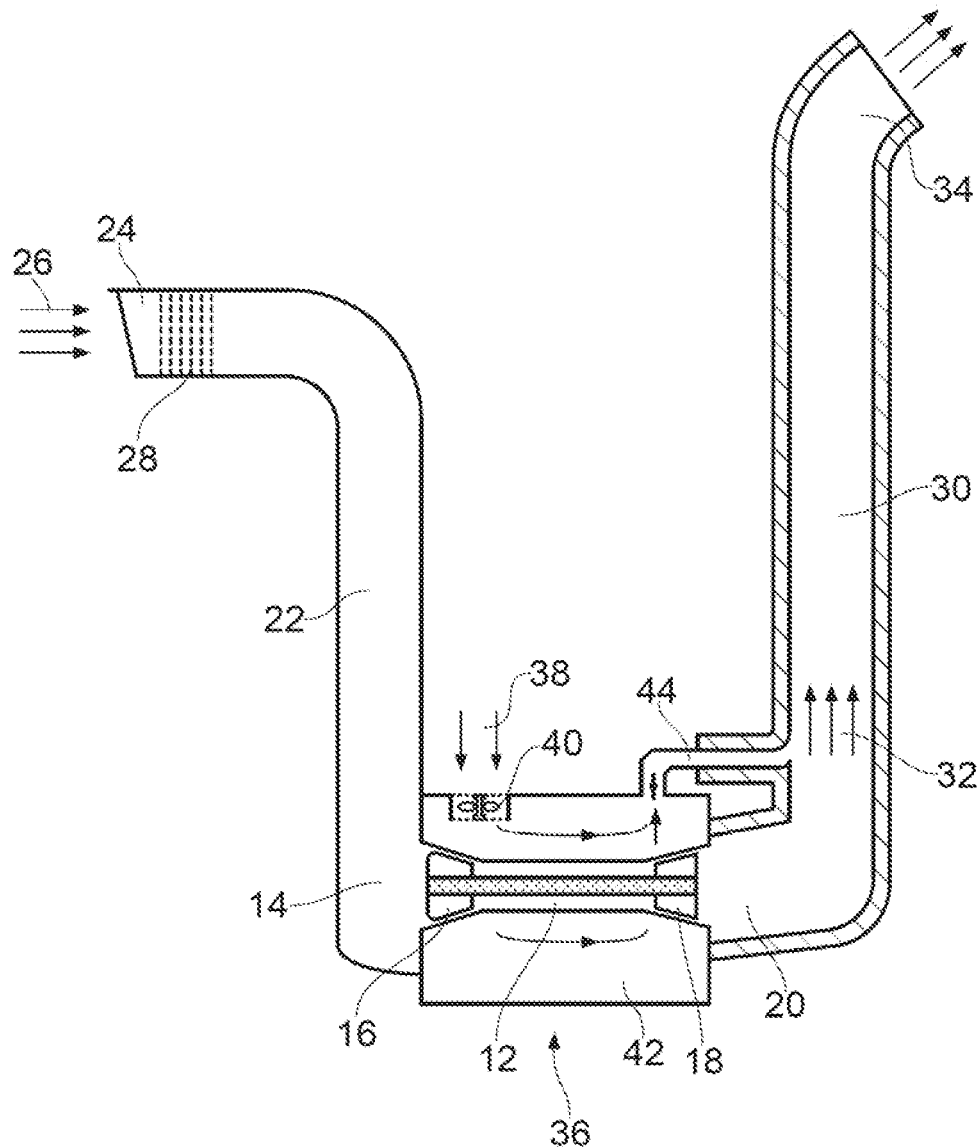
Figure 2:
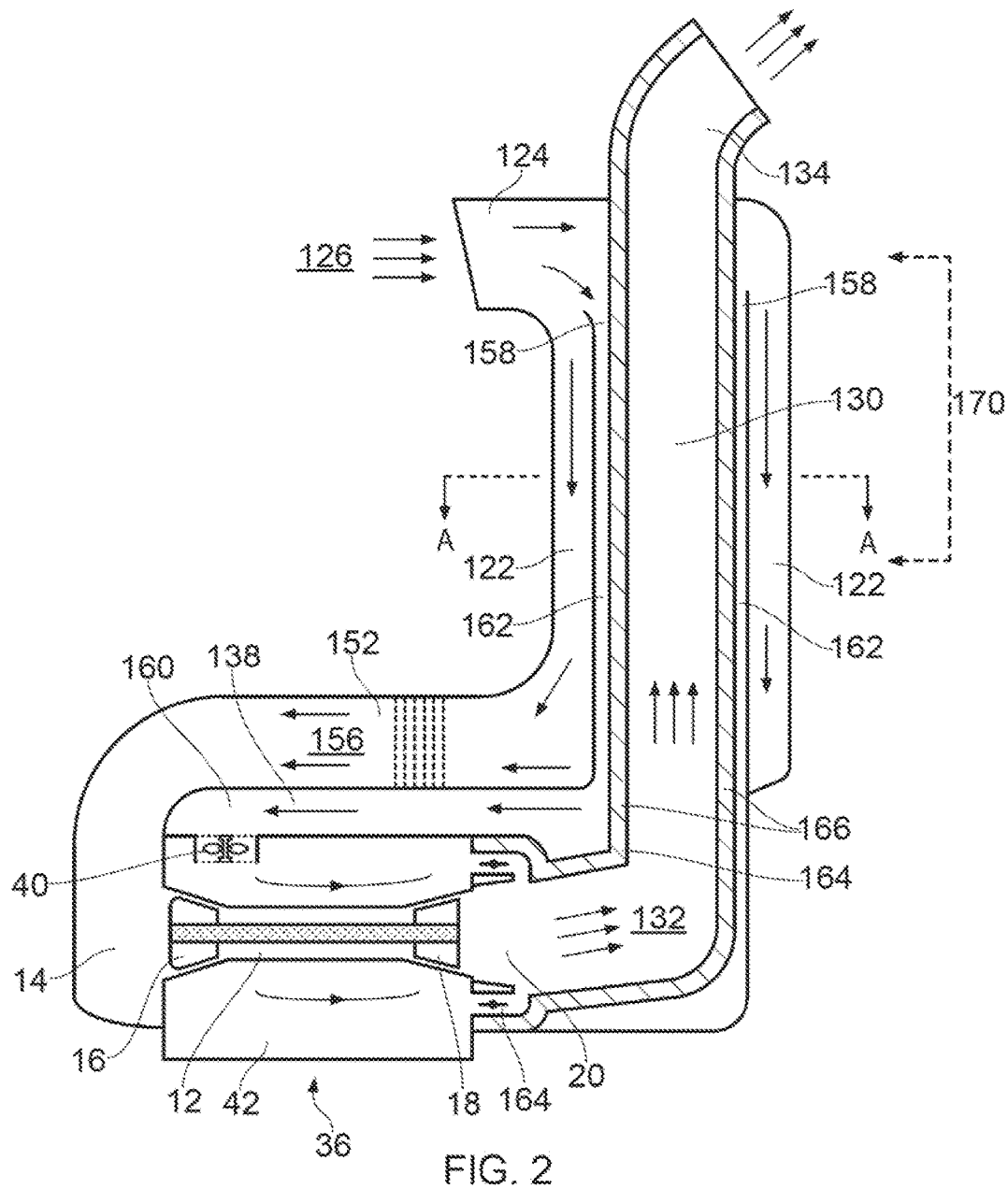
FIG. 2 shows schematically a cross-sectional view of a first embodiment of a duct arrangement according to a first aspect of the invention.

FIG. 2 illustrates a first embodiment of a duct arrangement according to a first aspect of the invention. As in FIG. 1, it is an arrangement of inlet and exhaust ducts for a marine installation of a gas turbine engine 12 having an engine intake 14 through which air flows to compressor stages 16. Following combustion, the hot gases pass through turbine stages 18 to an engine exhaust 20. The engine 12 is mounted within an engine enclosure 36 within the engine room (not shown) of a ship.

In use, air 126 flows into a duct intake 124, on the outside of the ship. The air flow passes through an annular inlet duct 122 to a plenum 152, in which is a filter 128 to remove particulates from the air flow. The filtered air flow 156 then passes to the engine intake 14.

The exhaust gases 132 from the gas turbine engine 12 pass from the engine exhaust 20 through an exhaust duct 130. The exhaust duct 130 is surrounded by thermal insulation 166. The exhaust gases flow to an exhaust outlet 134 on the outside of the ship.

Within the inlet duct 122 is an annular cooling air offtake 158, into which part of the inlet air flow 126 passes. This cooling air flow 138 passes through an annular cooling air duct 162 into a plenum 160, from where it is pushed by a fan 40 and/or sucked by an eductor 164 through a space 42 surrounding the gas turbine engine 12, after which it joins the flow 132 of the engine exhaust gases.

The embodiment of FIG. 2 shows both a fan 40 and an eductor 164. In other embodiments of the invention, only one of these may be present. Alternatively, both a fan and an eductor may be present, but the fan may be controlled so that it is only switched on when required to maintain the air flow through the space 42. An eductor may be less efficient under some engine operating conditions, for example at idle, and at these times it may be augmented by a switchable fan.

Because the package cooling air (which is at a relatively low temperature) mixes with the exhaust gases (which are at a higher temperature), the temperature of the exhaust gases is reduced, which is advantageous for the reasons discussed above.

As described above, and as more clearly shown in FIG. 3, the exhaust duct 130 (with its thermal insulation 166) is contained within the annular cooling air duct 162, which in turn is contained within the inlet duct 122. In this way, heat transfer from the exhaust gases in the exhaust duct 130 to the inlet air flow in the inlet duct 122 is prevented by the insulating effects of the thermal insulation 166 and of the annular layer of air within the cooling air duct 162. Therefore, the inlet and exhaust ducts need not be separately routed as in known arrangements. This is advantageous, because only one duct need be accommodated within the ship. Furthermore, because the exhaust duct is effectively insulated by the cooling air duct and the inlet duct, less heat is transferred from the exhaust duct into the ship, which simplifies the heat management for the whole vessel.

It is likely that in a real installation, the heat load from the exhaust duct into the ship would be less than 20 kW. Transferring this heat instead into the package cooling air would only increase its temperature by a few degrees, which could easily be accommodated. If necessary, the package cooling air flow could be increased slightly to accommodate the additional heat.

Furthermore, because the hot exhaust duct is enclosed by ducts containing cooler air for much of its length, the infrared signature of the vessel may be reduced, which may be advantageous in some applications.

Over the extent indicated by the dashed lines 170, the cross-section of the duct arrangement is uniform. In a real embodiment of the invention, this part of the duct arrangement would be as long as necessary to reach from the location of the engine to the outside of the ship. As noted in the introduction, it is advantageous for the inlet and exhaust ducts to be uniform and unimpeded, and this is readily achieved by the invention. It may also offer advantages in ease of manufacture and installation.

The duct intake 124 and exhaust outlet 134, as indicated above, are located at convenient positions on the outside of the ship. For example, the ducts 122, 162, 130 may extend generally vertically, with the intake 124 and outlet 134 positioned on the superstructure of the vessel. It may be convenient to separate the duct intake 124 and the exhaust outlet 134, or to orient them in opposite directions, to reduce the possibility of ingestion of exhaust gases into the engine intake. This will be described in more detail below.

Figure 3:
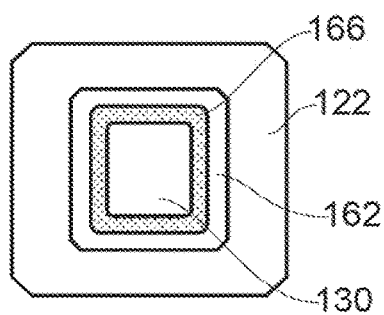
FIG. 3 shows a plan view on the line A-A in FIG. 2.

In the embodiment shown in FIGS. 2 and 3, the ducts are of generally square section and are concentric. In other embodiments, the ducts may have a different cross-sectional shape, for example circular or rectangular, which may be easier to manufacture or may be more conveniently accommodated within the ship. Although the concentric arrangement of the ducts in this embodiment may be advantageous, by providing more uniform thermal isolation between the ducts, in other embodiments the ducts' centres may be offset.

Figure 4:
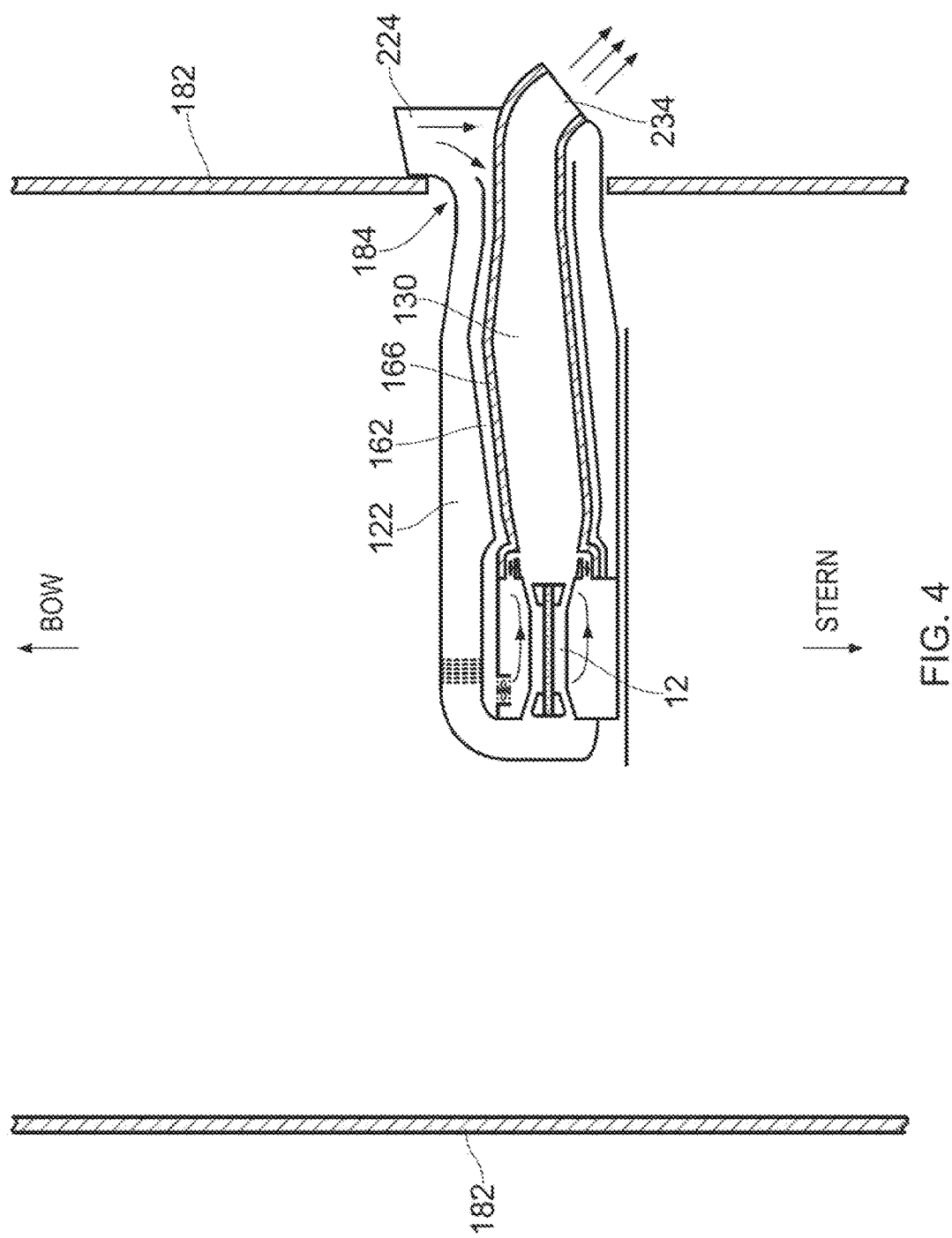
FIG. 4 shows schematically an installation in a ship of a second embodiment of a duct arrangement according to a first aspect of the invention.

Referring now to FIG. 4, a second embodiment of a duct arrangement according to a first aspect of the invention is shown installed within the hull 182 of a ship. In this embodiment, the engine 12 is mounted transversely or athwartships within the hull 182.

In other respects, the arrangement in the vicinity of the engine 12 is similar to that shown in FIG. 2 and need not be described in more detail. Because almost all of the duct arrangement extends away from the turbine, or hot, end of the engine, this arrangement is particularly convenient for use in conjunction with what is termed a 'cold end driven' alternator; that is to say, one which is driven from the compressor end of the engine.

The duct arrangement, comprising exhaust duct 130, thermal insulation 166, cooling air duct 162 and inlet duct 122, is broadly as shown in the embodiment of FIG. 2, but in this embodiment extends generally horizontally and transversely, to an opening 184 in the side of the hull 182.

The inlet duct 122 terminates in a duct intake 224, which faces towards the bow of the ship. In this way, the normal forward movement of the ship encourages the flow of clean air into the duct intake 224. The exhaust duct 130 terminates in an exhaust outlet 234, which faces towards the stern of the ship. This helps to draw the exhaust gases out of the exhaust outlet 234 and also helps to prevent the ingestion of exhaust gases into the inlet air, which may be detrimental to the operation of the engine 12.

The arrangement shown in FIG. 4 offers a further advantage, in that the duct arrangement, comprising exhaust duct 130, thermal insulation 166, cooling air duct 162 and inlet duct 122, may be easily removed from the hull 182 for maintenance or repair. The resulting opening 184 in the hull 182 may then provide a convenient means for removing the engine 12 or the alternator. Alternatively, because substantially the whole of the duct arrangement extends from the turbine end of the engine, it may be convenient to arrange for the engine to be removable from its compressor end, which may then be done without disturbing the duct arrangement. Where the layout of the ship permits a suitable space adjacent to the engine enclosure, this would allow quick and simple engine removal and replacement.

The embodiments described above use a gas turbine engine, but it will be appreciated that any internal combustion engine will require an air inlet and an exhaust, and so the invention may equally well be applied to other types of engine.

The invention has been described in connection with marine installations, where the engine is mounted in a ship. However, the invention could equally be applied to engine installations in other structures, such as other types of water- or land-based vehicle, or in stationary, land-based installations where the engine enclosure would be located in a structure such as a building, or in a room of a building.

The invention provides an arrangement of inlet and exhaust ducts for an internal combustion engine that reduces or overcomes problems of known arrangements. In particular, by containing one duct within the other, effectively only one duct needs to be accommodated rather than two. This may be particularly advantageous for pleasure craft such as superyachts, in which the layout and arrangement of the living accommodation is generally a priority. The invention allows the duct arrangements for the engine to be much less intrusive than in known arrangements. By interposing the cooling air duct between the first duct and the second duct to provide thermal isolation between them, the respective temperatures of the gas flows in the first and second ducts can be maintained and the engine can be supplied with cool intake air to ensure its optimal operation.

The invention claimed is:

1. A duct arrangement for an internal combustion engine, the arrangement comprising an exhaust duct, an inlet duct and a cooling air duct, the arrangement characterised in that the exhaust duct is contained within the cooling air duct for a whole length and the cooling air duct is contained within the inlet duct for a whole length to provide a barrier to limit heat transfer between gas flowing in the exhaust duct and gas flowing in the inlet duct.

2. The arrangement of claim 1, in which there is thermal insulation between the exhaust duct and the cooling air duct.

3. The arrangement of claim 2, in which there is a plenum between the inlet duct and the engine.

4. The arrangement of claim 3, in which the plenum comprises a filter for the inlet air.

5. The arrangement of claim 1, in which the inlet duct and cooling air duct share a common air intake.

6. The arrangement of claim 1, in which the exhaust duct, the inlet duct and the cooling air duct are concentric for their whole length.

7. The arrangement of claim 1 when installed in a structure, in which the inlet duct, the exhaust duct and the cooling air duct terminate in a common opening at an outside wall of the structure.

8. The arrangement of claim 7, in which the structure is a ship.

9. The arrangement of claim 8, in which the inlet duct terminates in an intake facing towards the bow of the ship.

10. The arrangement of claim 8, in which the exhaust duct terminates in an outlet facing towards the stern of the ship.

11. The arrangement of claim 8, in which the inlet and exhaust ducts extend generally horizontally and the common opening is on the side of the hull.

12. The arrangement of claim 1, in which the engine is a gas turbine engine.

13. A ship comprising a duct arrangement for an internal combustion engine, the arrangement comprising an exhaust duct, an inlet duct and a cooling air duct, the arrangement characterised in that the exhaust duct is contained within the cooling air duct for a whole length and the cooling air duct is contained within the inlet duct for a whole length to provide a barrier to limit heat transfer between gas flowing in the exhaust duct and gas flowing in the inlet duct.

* * * * *